(12) United States Patent
Dagtas

(10) Patent No.: US 7,136,571 B1
(45) Date of Patent: Nov. 14, 2006

(54) SYSTEM AND METHOD FOR FAST PLAYBACK OF VIDEO WITH SELECTED AUDIO

(75) Inventor: Serhan Dagtas, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1130 days.

(21) Appl. No.: 09/686,793

(22) Filed: Oct. 11, 2000

(51) Int. Cl.
*H04N 5/91* (2006.01)
*H04N 5/85* (2006.01)

(52) U.S. Cl. ............... 386/68; 386/75; 386/81; 386/125

(58) Field of Classification Search ............ 386/68, 386/67, 75, 81, 82, 96, 100, 104, 105, 106, 386/125, 124, 46, 45, 39, 40, 6, 7; H04N 5/91, H04N 5/85
See application file for complete search history.

(56) References Cited

U.S. PATENT DOCUMENTS 4,777,537 A * 10/1988 Ueno et al. ............... 386/101
5,583,652 A * 12/1996 Ware ......................... 386/75
5,781,696 A    7/1998 Oh et al. ................. 395/2.79

FOREIGN PATENT DOCUMENTS

| GB | 2305830 A | 4/1997 |
|----|-----------|--------|
| JP | 4168499   | 6/1992 |
| WO | WO9709713 | 3/1997 |

* cited by examiner

*Primary Examiner*—Robert Chevalier

(57) ABSTRACT

There is disclosed a video playback device for playing back a video program in fast forward mode on a display screen coupled to the video playback device. The video playback device contains an apparatus for selectively playing back portions of an audio signal associated with the video program during fast forward mode. The apparatus comprises: 1) an audio filtering processor for identifying a plurality of audio sub-segments in the audio signal and determining an importance factor associated with each of the plurality of audio sub-segments; and 2) a video processor coupled to and controlled by the audio filtering processor, wherein the audio filtering processor transmits selected ones of the plurality of audio sub-segments to the video processor and causes the video processor to play the selected audio sub-segments concurrently with a corresponding portion of a video signal from the video program during fast forward mode.

21 Claims, 4 Drawing Sheets

US 7,136,571 B1

SYSTEM AND METHOD FOR FAST PLAYBACK OF VIDEO WITH SELECTED AUDIO

TECHNICAL FIELD OF THE INVENTION

The present invention is directed, in general, to video playback devices and, more specifically, to a system for playing back video in fast forward mode with selected portions of the audio track.

BACKGROUND OF THE INVENTION

A wide variety of video playback devices are available in the marketplace. Most people own, or are familiar with, a video cassette recorder (VCR), also referred to as a video tape recorder (VTR). More recently, video recorders that use computer magnetic hard disks rather than magnetic cassette tapes to store video programs have appeared in the market. For example, the ReplayTV™ recorder and the TiVO™ recorder digitally record television programs on hard disk drives using, for example, MPEG-2 compression. Additionally, some video playback devices may record on a readable/writable digital versatile disk (DVD) rather than a magnetic disk.

Virtually all the systems that are capable of playing video programs have fast forward and rewind features. During the fast forwarding or rewinding of a video program, the audio portion of the video program is usually muted. As is well known in the art, increasing the speed of a video program, whether rewinding or fast forwarding, causes distortion in the audio. There are methods for speeding up the playback of speech by 50% with minimal effect on quality. However, this is not sufficient for high speed play modes and non-speech segments of the audio track.

There is therefore a need in the art for a system and method that will provide the playback video signal with corresponding undistorted audio during fast play modes such as fast forward.

SUMMARY OF THE INVENTION

To address the above-discussed deficiencies of the prior art, it is a primary object of the present invention to provide, for use in a video playback device capable of playing back a video program in fast forward mode on a display screen coupled to the video playback device, an apparatus for selectively playing back portions of an audio signal associated with the video program during the fast forward mode. According to an advantageous embodiment of the present invention, the apparatus comprises: 1) an audio filtering processor capable of identifying a plurality of audio sub-segments in the audio signal and determining an importance factor associated with each of the plurality of audio sub-segments; and 2) a video processor coupled to and controlled by the audio filtering processor, wherein the audio filtering processor transmits selected ones of the plurality of audio sub-segments to the video processor and causes the video processor to play the selected audio sub-segments concurrently with a corresponding portion of a video signal from the video program during the fast forward mode.

According to one embodiment of the present invention, the audio filtering processor is capable of identifying the plurality of audio subsegments according to a category associated with the audio signal during each of the plurality of audio subsegments.

According to another embodiment of the present invention, the category comprises at least one of a silence period, a noise period, a speech period, and a music period in the audio signal.

According to still another embodiment of the present invention, the category further comprises at least one of a plurality of keywords detected during the speech period and a level of stress detected during the speech period.

According to yet another embodiment of the present invention, the audio filtering processor determines the importance factor as a function of the category.

According to a further embodiment of the present invention, the audio filtering processor transmits selected audio sub-segments having comparatively higher Importance Factors to the video processor during the fast forward mode.

According to a still further embodiment of the present invention, the audio filtering processor does not transmit to the video processor selected audio subsegments associated with at least one of the silence period, the noise period, and the music period in the audio signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video playback device.

Figure 1:
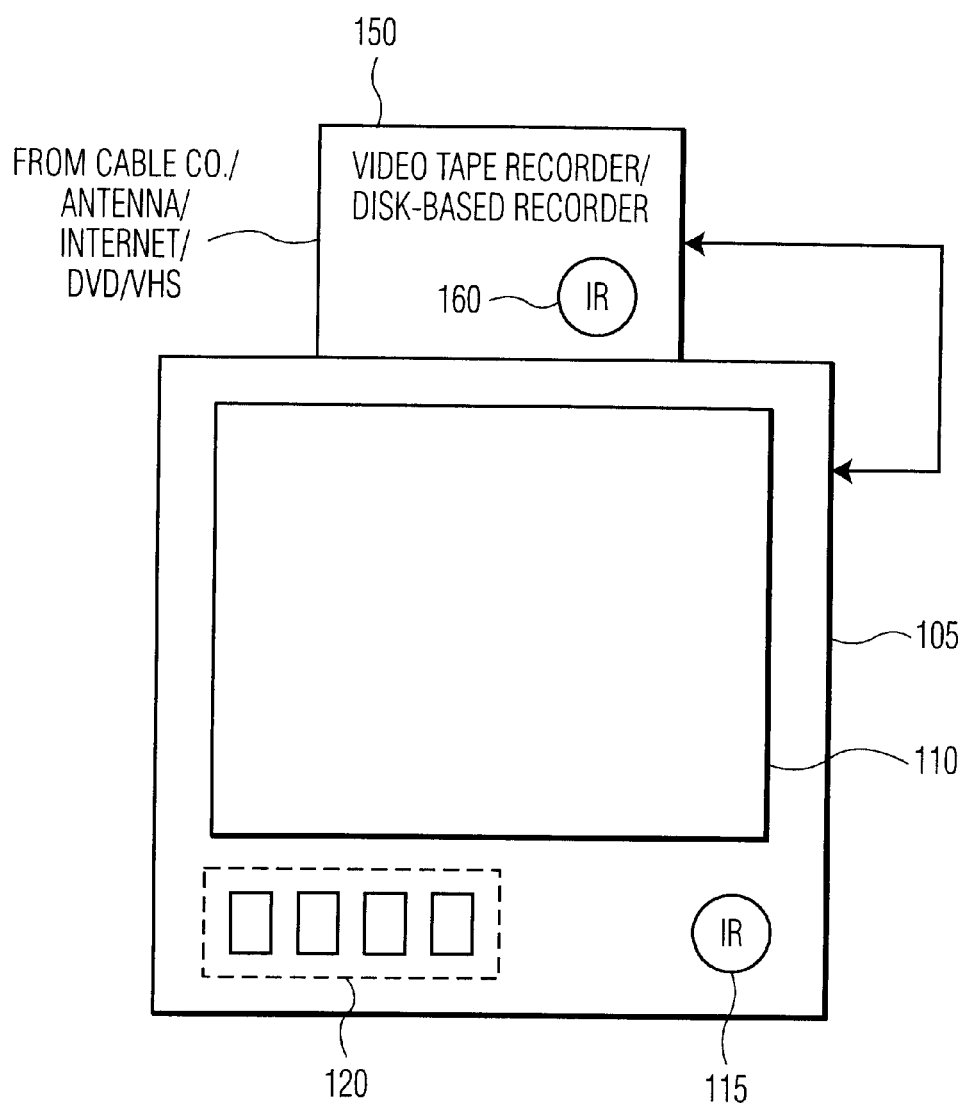
FIG. 1 illustrates an exemplary video playback device and a television set according to one embodiment of the present invention.

FIG. 1 illustrates exemplary video playback device 150 and television set 105 according to one embodiment of the present invention. Video playback device 150 receives incoming television signals from an external source, such as a cable television service provider (Cable Co.), a local antenna, the Internet, or a DVD or VHS tape player, and transmits a viewer-selected channel to television set 105. In RECORD mode, video playback device 150 may demodulate an incoming radio frequency (RF) television signal to produce a baseband video signal that is recorded and stored on a storage medium within or connected to video playback device 150. In PLAY mode, video playback device 150 reads a stored baseband video signal (i.e., program) selected by the user from the storage medium and transmits it to television set 105.

For example, if video playback device 150 is a video cassette recorder (VCR), also referred to as a video tape recorder (VTR), video playback device 150 stores and retrieves the incoming television signals to and from a magnetic cassette tape. If video playback device 150 is a disk drive-based device, such as a ReplayTV™ recorder or a TiVO™ recorder, video playback device 150 stores and retrieves the incoming television signals to and from a computer magnetic hard disk rather than a magnetic cassette tape. In still other embodiments, video playback device 150 may store and retrieve from a local read/write (R/W) digital versatile disk (DVD) or R/W CD-ROM. Thus, the local storage medium may be fixed (i.e., hard disk drive) or removable (i.e., DVD, CD-ROM).

Video playback device 150 comprises infrared (IR) sensor 160 that receives commands (such as Channel Up, Channel Down, Volume Up, Volume Down, Record, Play, Fast Forward (FF), Reverse, and the like) from a remote control device operated by the viewer. Television set 105 is a conventional television comprising screen 110, infrared (IR) sensor 115, and one or more manual controls 120 (indicated by a dotted line). IR sensor 115 also receives commands (such as volume up, volume down, power ON/OFF) from a remote control device operated by the viewer.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. In some embodiments, video playback device 150 may not even be able to record, but may be limited to playing back television signals that are retrieved from a removable DVD or CD-ROM. Thus, the incoming signal may be a digital signal, an analog signal, or Internet protocol (IP) packets. However, for the purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 2:
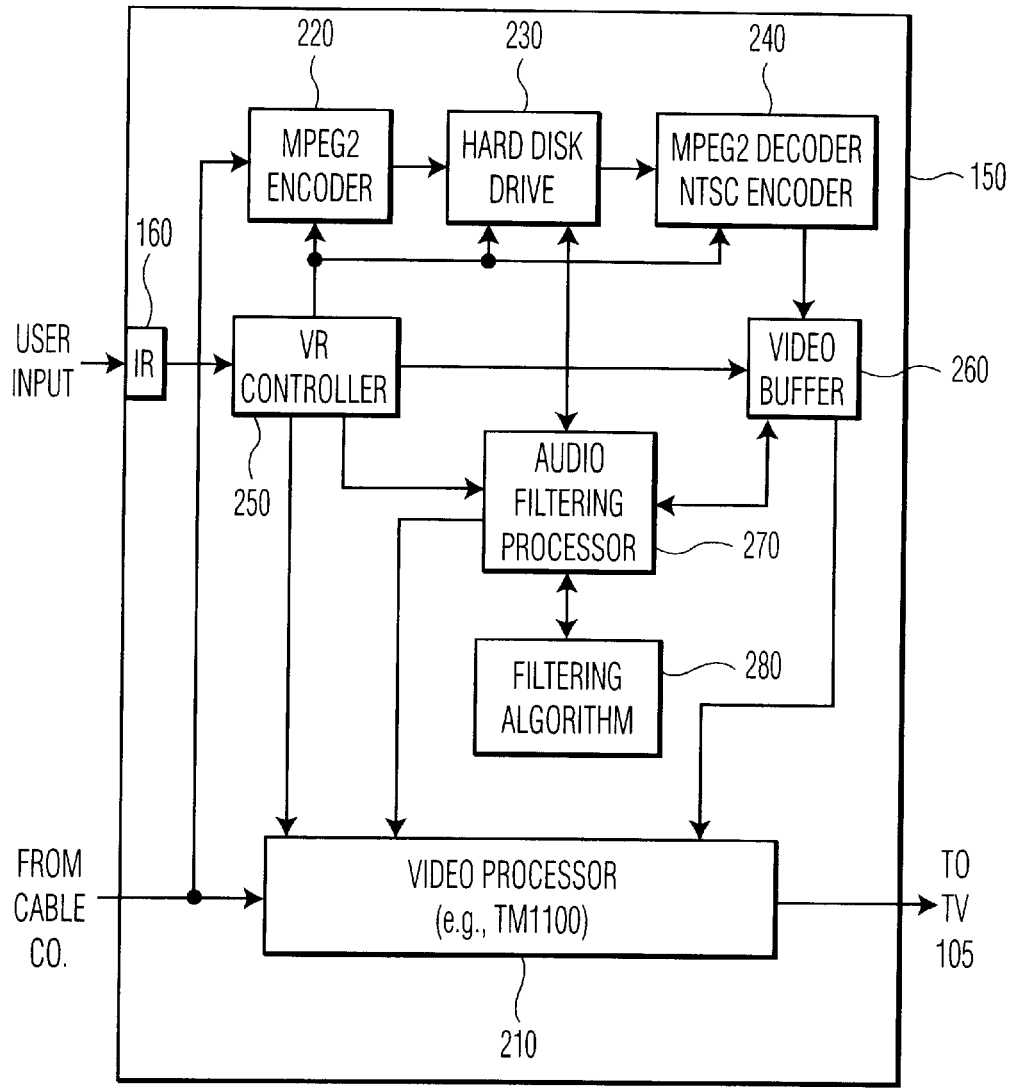
FIG. 2 illustrates in greater detail the exemplary video playback device according to one embodiment of the present invention.

FIG. 2 illustrates exemplary video playback device 150 in greater detail according to one embodiment of the present invention. Video playback device 150 comprises IR sensor 160, video processor 210, MPEG2 encoder 220, hard disk drive Frecor, MPEG2 decoder/NTSC encoder 240, and video recorder (VR) controller 250. Video playback device 150 further comprises video buffer 260, audio filtering processor 270, and filtering algorithm 280, which may be embodied as a memory that stores an audio filtering algorithm as a sequence of program instructions executed by audio filtering processor 270. VR controller 250 directs the overall operation of video playback device 150, including View mode, Record mode, Play mode, Fast Forward (FF) mode, Reverse mode, among others.

In View mode, VR controller 250 causes the incoming television signal from the cable service provider to be demodulated and processed by video processor 210 and transmitted to television set 105, without storing or retrieving from hard disk drive 230. Video processor 210, which may be, for example, a TriMedia (TM) 1100 media processor, contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 (after buffering in video buffer 260) during Play mode and transmitting baseband television signal (e.g., super video signal) to television set 105.

In Record mode, VR controller 250 causes the incoming television signal to be stored on hard disk drive 230. Under the control of VR controller 250, MPEG2 encoder 220 receives the incoming television signal from the cable service provider and converts the received RF signal to MPEG format for storage on hard disk drive 230. In Play mode, VR controller 250 directs hard disk drive 230 to stream the stored television signal (i.e., program) to MPEG2 decoder/NTSC encoder 240, which converts the MPEG2 data from hard disk drive 230 to, for example, a super video (S-Video) signal that is buffered in video buffer 260 before video processor 210 transmits it to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards.

For the purposes of this application and the claims that follow, hard disk drive 230 is defined to include any mass storage device that is both readable and writable, including conventional magnetic disk drives and optical disk drives for read/write digital versatile disks (DVD-RW), re-writable CD-ROMs, VCR tapes and the like. In fact, hard disk drive 230 need not be fixed in the conventional sense that is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or attached), such as a juke box device that holds read/write DVDs or re-writable CD-ROMs. Furthermore, in an advantageous embodiment of the present invention, hard disk drive 230 may include external mass storage devices that video playback device 150 may access and control via a network connection (e.g., Internet protocol (IP) connection), including, for example, a disk drive in the user's home personal computer (PC) or a disk drive on a server at the user's Internet service provider (ISP).

During Play mode, VR controller 250 may receive a Fast Forward (FF) command from a user via IR sensor 160. In FF mode, video playback device 150 is capable of playing selected portions of the audio signal with minimum pitch distortion using video buffer 260, audio filtering processor 270, and filtering algorithm 280. When a FF command is received, VR controller 250 causes hard disk drive 230 and MPEG2 decoder/NTSC encoder 240 to play video at a faster forward speed. However, VR controller 250 also directs video processor 210 to stop receiving the audio output of MPEG2 decoder/NTSC encoder 240 as a source of the audio signal. Instead, video processor 210 is switched to receive the audio signal from the output of audio filtering processor 270 as the source of the audio signal.

Figure 3:
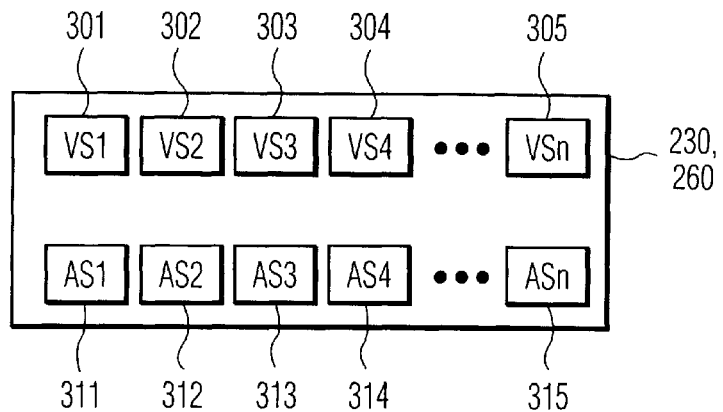
FIG. 3 illustrates video segments and corresponding audio segments from an exemplary video program stored in a video buffer (or a hard disk drive) according to one embodiment of the present invention.

FIG. 3 illustrates N video segments and N corresponding audio segments from an exemplary video program stored in video buffer 260 (or hard disk drive 230) according to one embodiment of the present invention. The N video segments include exemplary video segments (VS) 301–305, which are labeled VS1, VS2, VS3, VS4, and VSn, respectively. The audio segments include corresponding exemplary audio segments 311–315, which are labeled AS1, AS2, AS3, AS4, and ASn, respectively.

In a first mode, the audio track has been segmented and stored on hard disk drive 230. Segments on the audio track comprise relatively long periods of recorded sound. These periods of recorded sound may include complete sentences or phrases in an audio track with speech, multiple bars of music, a period of time with random noise, etc. Audio filtering processor 270 reads an audio track directly from hard disk drive 230 and transmits selected segments to video processor 210. Each segment is assigned an "importance factor" (IF) which will be used in selecting segments that will be played back in fast mode. A filtering algorithm picks the audio segments to be correlated and played as video is displayed in a fast play mode.

Fast forwarding may vary in playback speed and the algorithm adjusts its criteria accordingly. Generally, segments may be played back without distortion, at slower speeds, but it is more likely that words or smaller "sub-segments" of a segment may be fast played without some distortion. Sub-segments are portions of the audio track that have beginnings and endings within the segments. For instance, in a speech track, a sub-segment would include a single word or the pause between words. Sub-segments may be selected and transmitted to video processor 210 as in the segment mode.

In a second mode, audio filtering processor 270 reads an audio track from video buffer 260. Audio filtering processor 270 detects segments or sub-segments within the segments, as described above, then categorizes and associates Importance Factors (IF) with the segments "on the fly." While audio processing is going on, the video track is delayed for a period of time by video buffer 260 and then matched up with the audio track for playback.

Figure 4:
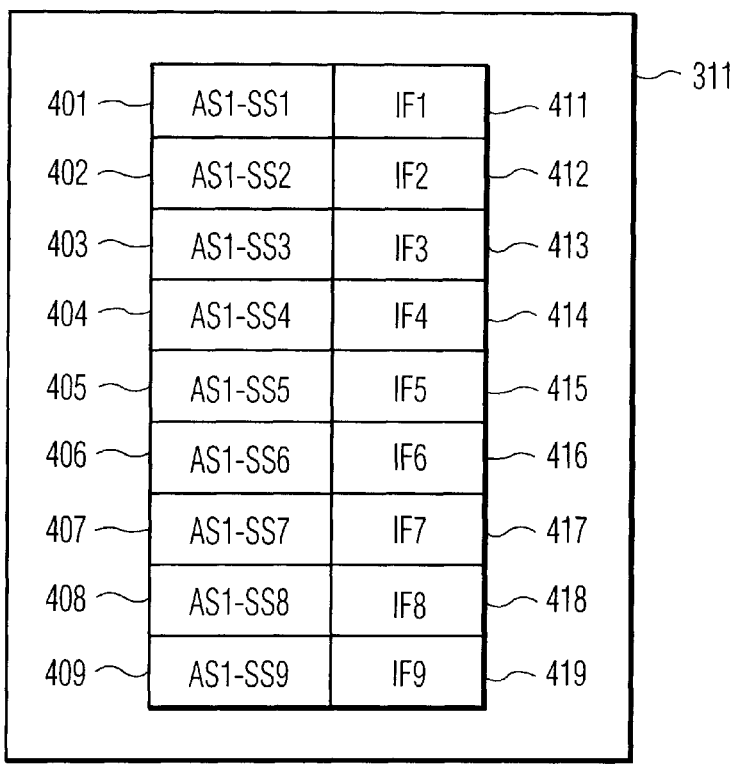
FIG. 4 illustrates a plurality of audio sub-segments within an exemplary audio segment according to one embodiment of the present invention.

FIG. 4 illustrates a plurality of audio and corresponding Importance Factors (IF) for exemplary audio segment 311 according to one embodiment of the present invention. The audio sub-segments include exemplary audio sub-segments 401–409, which are labeled AS1-SS1, AS1-SS2, AS1-SS3, AS1-SS4, AS1-SS5, AS1-SS6, AS1-SS7, AS1-SS8 and AS1-SS9, respectively. The audio sub-segments also include exemplary Importance Factors 411–419, which are labeled IF1, IF2, IF3, IF4, IF5, IF6, IF7, IF8 and IF9, respectively.

In a first mode, the audio track has been sub-segmented and stored on hard disk drive 230. Audio filtering processor 270 reads an audio track directly from hard disk drive 230 and transmits selected sub-segments to video processor 210. A filtering algorithm picks the audio sub-segments to be played as video is displayed in a fast play mode.

Fast forwarding may vary in playback speed and the algorithm adjusts its criteria accordingly. Generally, segments may be played back without distortion, at slower speeds, but it is more likely that words or smaller "sub-segments" of a segment may be fast played without some distortion. Sub-segments may be selected and transmitted to video processor 210 as in the above described segment mode.

In a second mode, audio filtering processor 270 reads an audio track from video buffer 260. Audio filtering processor 270 detects sub-segments (silence, or pauses, as well as sound) within the segments, as described above, then categorizes and associates Importance Factors with the sub-segments "on the fly." While audio processing is going on, the video track is delayed for a period of time by video buffer 260 and then matched up with the audio track. Keyword spotting and stress detection techniques are used to construct finer granularity IF computation.

Figure 5:
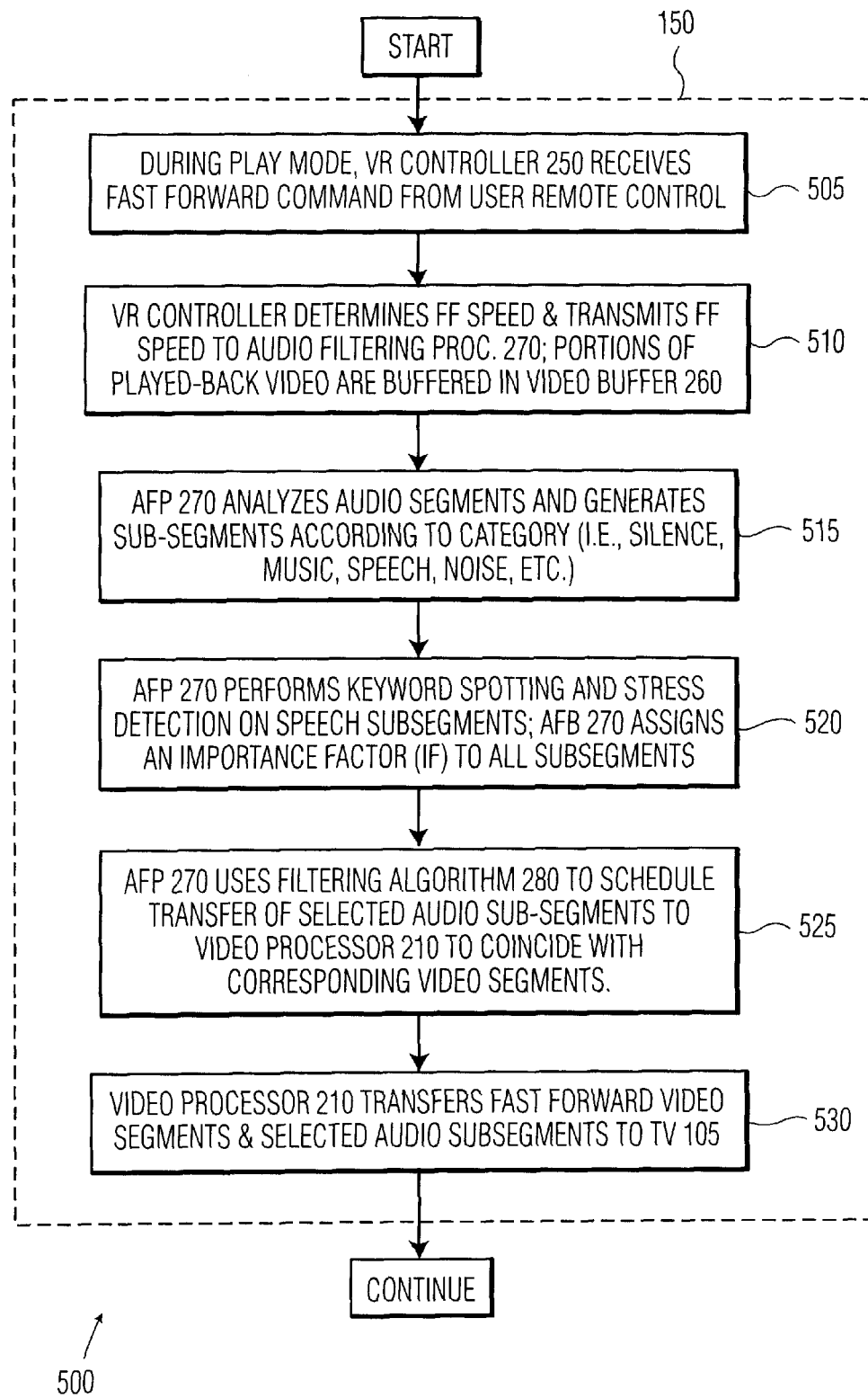
FIG. 5 is a flow diagram illustrating the operation of the exemplary video playback device according to one embodiment of the present invention.

FIG. 5 depicts flow diagram 500, which illustrates the operation of exemplary video playback device 150 according to one embodiment of the present invention. A fast forward command is depicted as being received by the VR controller 250 from a user's remote control (process step 500). VR controller 250 is illustrated as determining the FF speed and then transmitting that determination to audio filtering processor 270. Selected portions of the played-back video are then buffered in video buffer 270 (process step 510).

Audio filtering processor 270 is depicted reading the original audio track from video buffer 260, analyzing audio segments and then generating sub-segments according to category (i.e., silence, music, speech noise, etc.)(process step 515). Audio filtering processor 270 performs keyword spotting and stress detection on the speech sub-segments. The audio filtering processor 270 then assigns Importance Factors to all the sub-segments "on the fly" (process step 520)

Filtering algorithm 280 is utilized by audio filtering processor 270 to schedule the transfer of selected audio sub-segments to video processor 210. The algorithm 280 is used to match appropriate audio sub-segments with corresponding video segments according to assigned Importance Factors process step 525). Video processor 210 then transfers fast forward video segments and selected audio sub-segments to TV 105 (process step 530).

Video recorder/playback devices in fast forward and rewind modes generate audio distortion. The distortion is an undesirable feature and device manufacturers generally design the playback mechanism to mute the sound during fast forward or rewind. In the present invention, a selected segment or sub-segment of the audio, corresponding to appropriate video frames, may be played at normal speed along with the video segment or may be played up to 50% faster along with the video segment using well-known algorithms that compress audio without pitch distortion. When a sub-segment mode is utilized, the sub-segments reduce in size as the speed of the fast forward or rewind speed increases. A sub-segment may include two or three words at one speed and one word at a higher speed. Playback of selected segments of the audio in concert with the video improves quality of viewing video recordings in a fast play mode.

Although the present invention has been described in detail, those skilled in the art should understand that they can make various changes, substitutions and alterations herein without departing from the spirit and scope of the invention in its broadest form.

What is claimed is:

1. For use in a video playback device capable of playing back a video program in fast forward mode on a display screen coupled to said video playback device, an apparatus for selectively playing back portions of an audio signal associated with said video program during said fast forward mode, said apparatus comprising:

an audio filtering processor capable of identifying a plurality of audio sub-segments in said audio signal and determining an importance factor associated with each of said plurality of audio sub-segments; and a video processor coupled to and controlled by said audio filtering processor, wherein said audio filtering processor transmits selected ones of said plurality of audio sub-segments to said video processor and causes said video processor to play said selected audio sub-segments concurrently with a corresponding portion of a video signal from said video program during said fast forward mode.

2. The apparatus as set forth in claim 1 wherein said audio filtering processor is capable of identifying said plurality of audio sub-segments according to a category associated with said audio signal during each of said plurality of audio sub-segments.

3. The apparatus as set forth in claim 2 wherein said category comprises at least one of a silence period, a noise period, a speech period, and a music period in said audio signal.

4. The apparatus as set forth in claim 3 wherein said category further comprises at least one of a plurality of keywords detected during said speech period and a level of stress detected during said speech period.

5. The apparatus as set forth in claim 4 wherein said audio filtering processor determines said importance factor as a function of said category.

6. The apparatus as set forth in claim 5 wherein said audio filtering processor transmits selected audio sub-segments having comparatively higher Importance Factors to said video processor during said fast forward mode.

7. The apparatus as set forth in claim 6 wherein said audio filtering processor does not transmit to said video processor selected audio sub-segments associated with at least one of said silence period, said noise period, and said music period in said audio signal.

8. A video play back device comprising:

a storage device capable of storing thereon a plurality of video signals;

video recording circuitry capable of receiving an incoming video signal and storing said incoming video signal on said storage device;

video playback circuitry capable of retrieving a first selected video signal stored on said storage device and generating therefrom a played-back video signal capable of being displayed on a display screen coupled to said video play back device; and an apparatus for selectively playing back portions of an audio signal associated with said played-back video signal during said fast forward mode, said apparatus comprising:

an audio filtering processor capable of identifying a plurality of audio sub-segments in said audio signal and determining an importance factor associated with each of said plurality of audio sub-segments; and a video processor coupled to and controlled by said audio filtering processor, wherein said audio filtering processor transmits selected ones of said plurality of audio sub-segments to said video processor and causes said video processor to play said selected audio sub-segments concurrently with a corresponding portion of said played-back video signal during said fast forward mode.

9. The video play back device as set forth in claim 8 wherein said audio filtering processor is capable of identifying said plurality of audio sub-segments according to a category associated with said audio signal during each of said plurality of audio sub-segments.

10. The video play back device as set forth in claim 9 wherein said category comprises at least one of a silence period, a noise period, a speech period, and a music period in said audio signal.

11. The video play back device as set forth in claim 10 wherein said category further comprises at least one of a plurality of keywords detected during said speech period and a level of stress detected during said speech period.

12. The video play back device as set forth in claim 11 wherein said audio filtering processor determines said importance factor as a function of said category.

13. The video play back device as set forth in claim 12 wherein said audio filtering processor transmits selected audio sub-segments having comparatively higher Importance Factors to said video processor during said fast forward mode.

14. The video play back device as set forth in claim 13 wherein said audio filtering processor does not transmit to said video processor selected audio sub-segments associated with at least one of said silence period, said noise period, and said music period in said audio signal.

15. For use in a video playback device capable of playing back a video program in fast forward mode on a display screen coupled to the video playback device, a method for selectively playing back portions of an audio signal associated with the video program during the fast forward mode, the method comprising the steps of:

identifying a plurality of audio sub-segments in the audio signal;

determining an importance factor associated with each of the plurality of audio sub-segments; and playing selected ones of the plurality of audio sub-segments concurrently with a corresponding portion of a video signal from the video program during the fast forward mode.

16. The method as set forth in claim 15 wherein the step of identifying comprises the substep of identifying the plurality of audio sub-segments according to a category associated with the audio signal during each of the plurality of audio sub-segments.

17. The method as set forth in claim 16 wherein the category comprises at least one of a silence period, a noise period, a speech period, and a music period in the audio signal.

18. The method as set forth in claim 17 wherein the category further comprises at least one of a plurality of keywords detected during the speech period and a level of stress detected during the speech period.

19. The method as set forth in claim 18 wherein the step of determining comprises the substep of determining the importance factor as a function of the category.

20. The method as set forth in claim 19 wherein the step of playing selected audio sub-segments comprises the substep of playing selected audio sub-segments having comparatively higher Importance Factors during the fast forward mode.

21. The method as set forth in claim 20 wherein the step of playing selected audio sub-segments comprises the substep of dropping selected audio sub-segments associated with at least one of the silence period, the noise period, and the music period in the audio signal.

* * * * *